United States Patent [19]

Huth et al.

[11] Patent Number: 4,703,398
[45] Date of Patent: Oct. 27, 1987

[54] AUXILIARY BRAKE LIGHT FOR MOTOR VEHICLES

[75] Inventors: Lothar Huth, Boeblingen; Horst Dahm, Ostelsheim; Goetz Moetting, Boeblingen; Fritz Haeberle, Sindelfingen, all of Fed. Rep. of Germany

[73] Assignee: Daimler-Benz Aktiengesellschaft, Stuttgart, Fed. Rep. of Germany

[21] Appl. No.: 924,336

[22] Filed: Oct. 29, 1986

[30] Foreign Application Priority Data

Oct. 29, 1985 [DE] Fed. Rep. of Germany ....... 3538361

[51] Int. Cl.$^4$ .............................................. B60Q 1/44
[52] U.S. Cl. ..................................... 362/61; 362/226; 340/97; 439/573
[58] Field of Search ........................... 362/61, 80, 226; 339/119 L, 125 L, 125 R; 340/7, 87, 97

[56] References Cited

U.S. PATENT DOCUMENTS

| | | | |
|---|---|---|---|
| 2,688,688 | 9/1954 | Holtz | 362/226 |
| 3,432,808 | 3/1969 | Fleece | 340/84 |
| 3,718,816 | 2/1973 | Seelbach et al. | 362/226 X |
| 3,970,354 | 7/1976 | Hopkins et al. | 339/113 R |
| 4,575,782 | 3/1986 | Levine et al. | 362/61 |
| 4,602,320 | 7/1986 | Tomkin et al. | 362/80 |

Primary Examiner—Samuel Scott
Assistant Examiner—Allen J. Flanigan
Attorney, Agent, or Firm—Barnes & Thornburg

[57] ABSTRACT

An auxiliary brake light for motor vehicles which consists of a socket mounted securely on the hat storage shelf and of a light housing pivotally mounted on the socket toward the rear window; the auxiliary brake light includes means for sealing the light exit surface with respect to the rear window for preventing stray light; the light housing is displaceably and pivotally connected with the socket by way of bolts engaging in guide channels and at least one springy tongue projects from the socket which is adapted to be connected with the light housing in a detent-like manner.

7 Claims, 6 Drawing Figures

U.S. Patent  Oct. 27, 1987  Sheet 1 of 3  4,703,398
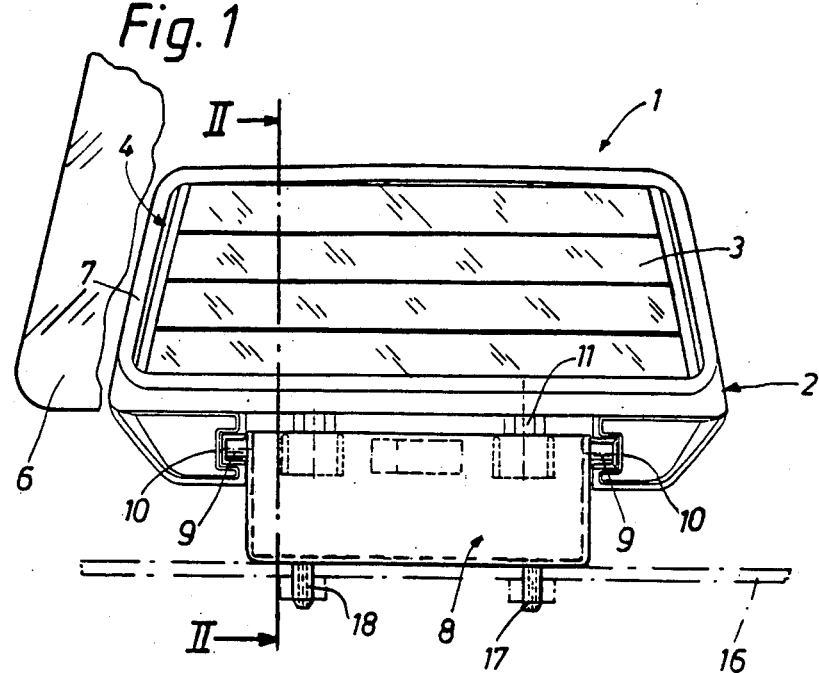
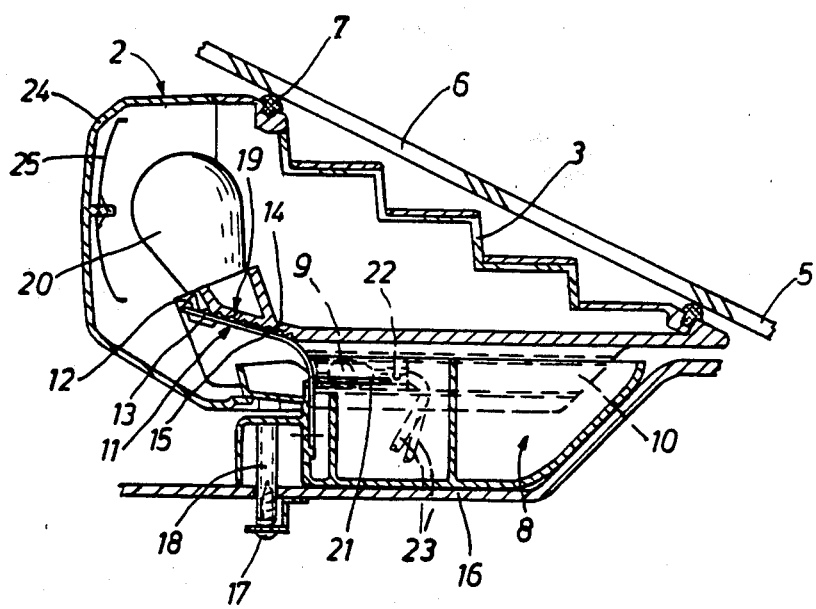

AUXILIARY BRAKE LIGHT FOR MOTOR VEHICLES

The present invention relates to an auxiliary brake light for motor vehicles which consists of a socket adapted to be securely pre-assembled on the hat shelf near a rear window and of a light housing adapted to be mounted on the socket pivotal with respect to the rear window.

A brake light is disclosed in the German Gebrauchsmuster No. 81 13 359 whose housing is pivotally supported by way of a screw about the screw-axis, with the screw extending through overlapping bores of the housing, and of a bottom plate secured on the hat shelf, and which is fixed in its end position by the clamping force of a nut. An elastic bellows is attached at the housing longitudinally displaceable toward the rear window which is to effect an improved stray light seal.

This structure can be assembled only very tediously on the bottom plate because the screw-nut-connection is accessible with difficulty and no hand remains free which could hold the housing in the correct position. A rapid disassembly as required is equally impossible. The bellows additionally appears optically unattractive and must be unilaterally compressed very strongly which jeopardizes its reliable function.

Accordingly, it is the task of the present invention to connect the light housing of an auxiliary brake light with a socket in such a manner that a reflection-free installation of the housing edge pointing toward the rear window at a rear window is assured and the connection can be established and disconnected in a simple manner.

The underlying problems are solved according to the present invention in that the socket or the light housing is provided with two oppositely disposed guide channels extending in the vehicle longitudinal direction in which guide bolts protruding from the light housing or from the socket are displaceably and rotatably guided, in that at least one springy tongue projects from the socket or from the light housing which during the assembly operation supports itself under prestress at a counter surface of the other component, whereby the counter surface and the surface of the tongue facing the same are provided with grooves or the like extending transversely to the displacement direction and forming a toothed arrangement, and in that the side of the light housing facing the rear window is matched in its course to the inclination of the rear window and is provided along its circumference with a soft rubber seal.

The housing is adapted to be assembled and disassembled without any auxiliary means. As a result of the pivotal engagement of the guide bolts in the guide channels and of the springy action of the tongue with a spring force directed against the rear window, assisted by the soft rubber seal, the housing edge abuts free of stray light against the rear window and thus avoids any distraction of the driver by brake light reflections. Also with occurring vehicle vibrations the light housing is pressed securely against the rear window by the tongue.

According to another feature of the present invention, pins leading away from the light housing and electrically connected with an incandescent lamp engage during the assembly in an electrical plug-in contact of the socket. This construction in accordance with the present invention offers the advantage that the electric contact from the incandescent lamp by way of the plug-in connection to the socket connection is assured by the construction of the plug-in connection in every detent position of the light housing with the socket and is automatically realized advantageously without influence of the assembling person.

These and other objects, features and advantages of the present invention will become more apparent from the following description when taken in connection with the accompanying drawing which shows, for purposes of illustration only, one embodiment in accordance with the present invention, and wherein:

FIG. 1 is a front elevational view of the auxiliary light in accordance with the present invention in its installed position;

FIG. 2 is a cross-sectional side view of the auxiliary light taken along line II—II of FIG. 1;

Figure 3:
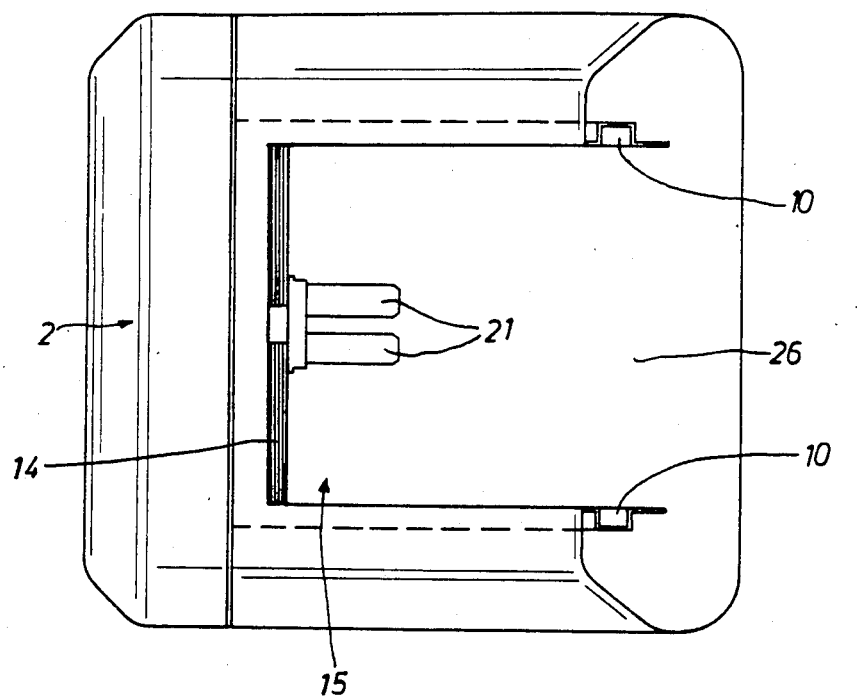
FIG. 3 is a bottom view of the light housing of FIG. 4.

Referring now to the drawing wherein like reference numerals are used throughout the various views to designate like parts, an auxiliary brake light generally designated by reference numeral 1 can be seen from FIG. 1 in the viewing direction of the following vehicle driver to whom the braking intention of the preceding driver is signalled at eye level by the lighting up of the light area section 3 provided in a light housing generally designated by reference numeral 2. The light housing 2 abuts with one side 4 which is approximately matched to the inclination 5 of a rear window 6, in a stray-light-sealed manner at the rear window 6 by way of a soft rubber seal 7, as a result of which the driver of the vehicle is not irritated by light reflections.

FIGS. 1 and 2 illustrate that the light housing 2 is connected with a socket 8 in that guide bolts 9 of the socket 8 engage rotatably and displaceably in oppositely disposed guide channels 10 of the light housing 2, and in that two elastic tongues 11 secured in the socket 8 which in the direction toward the light housing 2 possess a surface 12 with grooves 13, which during the assembly operation engage in corresponding grooves 14 of a counter surface 15 at the light housing 2, securely connect with each other the components 2 and 8 by an engagement of the toothed surfaces 12 and 15.

The elastic tongues 11 additionally fulfill the function that they press the light housing 2 with its soft rubber seal 7 against the rear window 6.

The socket 8 in its turn is securely preassembled at the hat storage shelf 16 by way of mounting pins 18 having an internal thread which extend through the hat storage shelf 16 and are retained by screws 17.

A detent engagement 19 of the tongue 11 in the counter surface 15 in an end position as well as the electrical contact resulting from the assembly operation can be seen in the drawing which is realized by the engagement of the pins 21 that extend away from an incandescent lamp 20 in the light housing 2, in a plug-in contact 22 secured at the socket 8 which is connected with a power supply network by way of a cable 23. The rear side of the light housing 2 which is formed by a housing cover 24 adjoining the front part, receives internally a light reflector 25 and, for purposes of exchanging the incandescent lamp 20 and for the disengagement of the toothed connection between the light housing 2 and socket 8, respectively, tongue 11, can be easily taken off.

Figure 4:
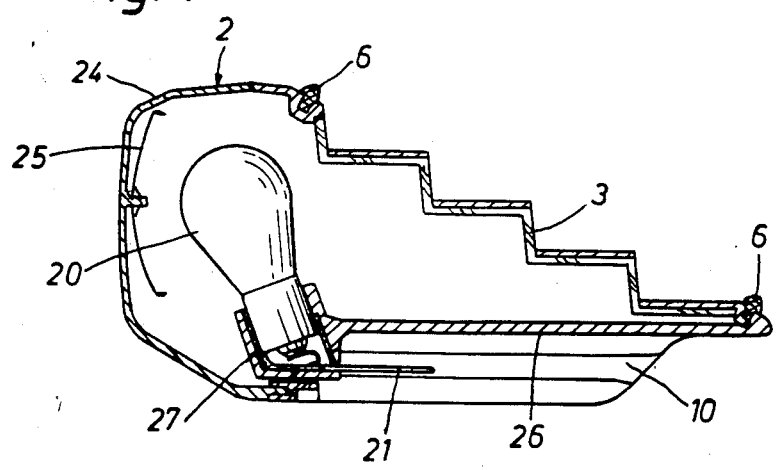
FIG. 4 is a central cross-sectional view of the light housing in accordance with the present invention.

In FIGS. 3 and 4, the light housing 2 is illustrated in a construction according to the present invention which includes the guide channels 10 for receiving the guide bolts 9 and an abutment surface 26 for the prestressed abutting tongue 11 as well as the pins 21 protruding from the incandescent lamp 20 mounted in a lamp socket 27 and the grooves 14 of the counter surface 15 for the toothed engagement of the tongue 11 in the end position.

Figure 5:
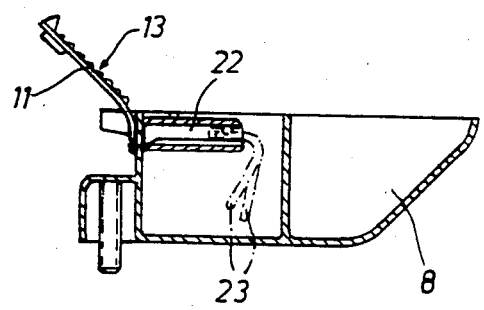
FIG. 5 is a central cross-sectional view of the socket.
Figure 6:
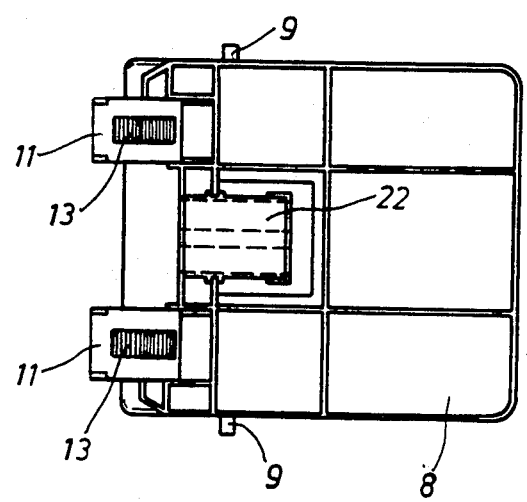
FIG. 6 is a plan view on the socket in accordance with the present invention.

The socket 8 can be seen from FIGS. 5 and 6 from which the guide bolts 9 for the engagement in the guide channels 10 of the light housing 2 protrude laterally, and which receives the plug-in contact 22 for establishing the electrical contact with the incandescent lamp 20 and at which the springy tongue 11 is secured which locks the socket 8 together with the light housing 2 in a detent-like manner and at the same time presses the light housing 2 against the rear window 6.

As a result of the construction of an auxiliary brake light in accordance with the present invention, certain tolerances both in the vehicle longitudinal direction as also as regards the window inclination can be automatically compensated for during the assembly.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An auxiliary brake light for motor vehicles, comprising socket means preassemblable securely near a rear window on a body part, a light housing means mountable pivotally on the socket means, and seal means for avoiding stray-light by sealing the light exit surface of the light housing means with respect to the rear window, one of socket and light housing means including two oppositely disposed guide channels extending substantially in the vehicle longitudinal direction in which guide bolts protruding from the other of the socket and light housing means are displaceably and rotatably guided, at least one springy tongue means projecting from one of socket and light housing means which during assembly is supported with prestress at a counter-surface of the other of said socket and light housing means, the counter surface and the surface of the tongue means facing the same being provided with grooves forming teeth and extending transversely to the displacement direction, and the side of the light housing means facing the rear window being matched in its course to the inclination of the rear window and being provided along its circumference with a soft rubber seal forming part of the seal means.

2. An auxiliary brake light according to claim 1, wherein pin means, which extend away from the light housing means and are electrically conductively connected with an incandescent lamp, engage during assembly in an electric plug-in contact means of the socket means.

3. An auxiliary brake light according to claim 2, wherein said light housing means includes a housing cover, and wherein the light housing means after removal of the housing cover is disengageable from the grooves of the counter surface by lifting off the freely accessible tongue means and is detachable from the socket means.

4. An auxiliary brake light according to claim 3, wherein the spring action of the tongue means is directed in the direction of the rear window.

5. An auxiliary brake light according to claim 1, wherein said body part is a hat deposit shelf.

6. An auxiliary brake light according to claim 1, wherein said light housing means includes a housing cover, and wherein the light housing means after removal of the housing cover is disengageable from the grooves of the counter surface bY lifting off the freely accessible tongue means and is detachable from the socket means.

7. An auxiliary brake light according to claim 1, wherein the spring action of the tongue means is directed in the direction of the rear window.

* * * * *